(12) United States Patent
Iwanir et al.

(10) Patent No.: US 10,250,587 B2
(45) Date of Patent: Apr. 2, 2019

(54) DETECTING MALICIOUS USAGE OF CERTIFICATES

(71) Applicant: Microsoft Technology Licensing, LLC., Redmond, WA (US)

(72) Inventors: Elad Iwanir, Metar (IL); Gal Tamir, Avichayl (IL); Shahar Weiss, Holon (IL); Eli Koreh, Kfar Saba (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 144 days.

(21) Appl. No.: 15/282,656

(22) Filed: Sep. 30, 2016

(65) Prior Publication Data
US 2018/0097803 A1 Apr. 5, 2018

(51) Int. Cl.
H04L 29/06 (2006.01)

(52) U.S. Cl.
CPC ...... H04L 63/0823 (2013.01); H04L 63/0815 (2013.01); H04L 63/14 (2013.01)

(58) Field of Classification Search
CPC ...... H04L 63/0823; H04L 63/10; H04L 63/20
USPC .......................... 726/1, 22, 23; 713/156, 158
See application file for complete search history.

(56) References Cited

U.S. PATENT DOCUMENTS

| | | | |
|---|---|---|---|
| 7,653,810 B2 | 1/2010 | Thornton et al. | |
| 7,925,898 B2 * | 4/2011 | Shear | G06Q 20/3825 713/156 |
| 7,984,291 B2 * | 7/2011 | Eronen | H04L 63/061 455/432.1 |
| 8,131,851 B2 * | 3/2012 | Harlow | H04L 41/048 709/202 |
| 8,429,734 B2 | 4/2013 | Agbabian et al. | |
| 8,473,735 B1 | 6/2013 | Jarvie et al. | |
| 8,516,552 B2 * | 8/2013 | Raleigh | G06Q 10/06375 726/2 |
| 8,560,851 B1 | 10/2013 | Cherukumudi et al. | |
| 8,776,186 B2 * | 7/2014 | Resch | H04L 9/085 713/156 |
| 8,966,659 B2 | 2/2015 | Janjua et al. | |
| 9,197,630 B2 | 11/2015 | Sharif et al. | |
| 9,246,934 B2 | 1/2016 | Sabin et al. | |
| 9,280,651 B2 | 3/2016 | Dragomir et al. | |
| 9,338,012 B1 | 5/2016 | Naik et al. | |

(Continued)

OTHER PUBLICATIONS

"Qualys Vulnerability Management (VM) Features", Retrieved on: Aug. 23, 2016 Available at: https://www.qualys.com/suite/vulnerability-management/features/.

(Continued)

*Primary Examiner* — Hosuk Song
(74) *Attorney, Agent, or Firm* — Merchant & Gould (57) ABSTRACT

The misuse of public key, private key, and public/private key certificates poses significant security challenges to computer networks that are addressed by certificate monitoring. Certificate monitoring allows network administrators to detect and remedy poor security practices related to public key certificates and to detect and combat the malicious use of public key certificates in a centralized environment. Best practices and detection methods and systems are developed over time via machine learning to improve network security, and any detected misuse may be brought to a network administrator's attention or automatically remedied.

20 Claims, 8 Drawing Sheets

(56) References Cited

U.S. PATENT DOCUMENTS 9,407,644 B1 8/2016 Cheng et al.
2016/0057132 A1* 2/2016 Gibson .............. H04L 63/0823
713/156

OTHER PUBLICATIONS

"BIG-IP and BIG-IQ cloud image vulnerability", Published on: Apr. 11, 2016 Available at: https://support.f5.com/kb/en-us/solutions/public/k/11/sol11772107.html.

Kumar, Mohit, "How Certificate Transparency Monitoring Tool Helped Facebook Early Detect Duplicate SSL Certs", Published on: Apr. 11, 2016 Available at: http://thehackernews.com/2016/04/certificate-transparency-monitoring.html.

"Good Practices for Managing Microsoft Azure Subscriptions", Published on: Jul. 30, 2013 Available at: https://blog.kloud.com.au/2013/07/30/good-practices-for-managing-windows-azure-subscriptions/.

* cited by examiner

DETECTING MALICIOUS USAGE OF CERTIFICATES

BACKGROUND

A certificate is a tool used to establish the identity of a party on the Internet and to provide for secure connections between parties. The certificate includes the identity of the party to whom it is issued and a public key (of a public/private key pair) by which messages to or from the party may be encrypted or decrypted. Certificates are provided by certificate authorities, which are trusted parties that ensure that the certificates are issued to the parties identified in those certificates—so that other parties may be assured that they are actually communicating with the party identified in the certificate. The use of certificates is part of several communications standards and many best-practices on the use, distribution, and retirement/expiration of certificates exist. The parties to whom certificates are issued, however, do not always follow the best practices for certificates, which can leave their systems, or the systems of the clients who communicate with their systems, vulnerable to malicious parties.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable storage media are provided herein to detect the misuse of certificates— including poor practices and malicious use—to improve the security of networked systems and environments. In various aspects, certificates are monitored to identify misuse, and recommendations or notifications are generated in response to detecting such misuse. Various rules representing best practices and malicious use patterns are installed or evolved (e.g., via machine learning) for use by a certificate monitor to provide detection, notifications, and automated remediation. In some aspects, a control interface is provided by which the certificates are managed according to the rules to affect the deployment of certificates and the monitoring of various devices and environments.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Systems, methods, and computer readable storage media are provided herein to detect the misuse of certificates— including poor practices and malicious use—to improve the security of networked systems and environments. In various aspects, certificates are monitored to identify misuse, and recommendations or notifications are generated in response to detecting such misuse. Various rules representing best practices and malicious use patterns are installed or evolved (e.g., via machine learning) for use by a certificate monitor to provide detection, notifications, and automated remediation. In some aspects, a control interface is provided by which the certificates are managed according to the rules to affect the deployment of certificates and the monitoring of various devices and environments.

Figure 1:
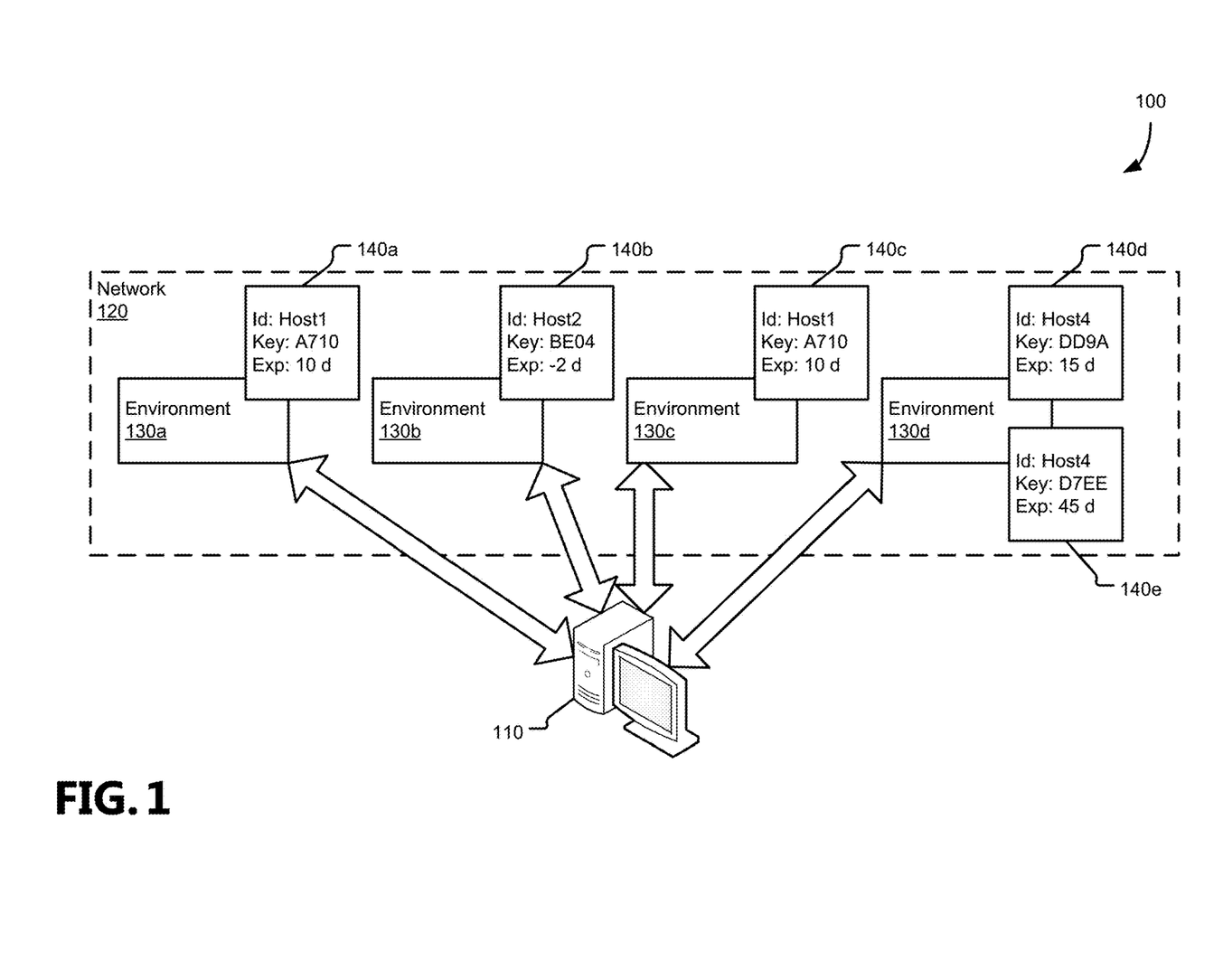
FIG. 1 illustrates an example system in which the present disclosure may be practiced.

FIG. 1 illustrates an example system 100 for which the present disclosure may be practiced. As illustrated, a user machine 110 is in communication with one or more host machines that are organized into various environments 130a-d (generally, environment 130) within a host's network 120. Certificates 140a-e (generally, certificates 140) are illustrated as being deployed on each environment 130 to enable secured communications with the user machine 110, such as, for example, via HTTPS (Hypertext Transfer Protocol—Secure) communications. As will be appreciated, although a given number of user machines 110, networks 120, environments 130, and certificates 140 are illustrated, in other systems 100 more or fewer may be present.

User machines 110 and host machines are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 5, 6A, 6B, and 7. User machines 110 are operated by users, who may be humans or automated systems (e.g., "bots"). In various aspects, the host machines may operate as one or more Virtual Machines (VMs) running on a shared infrastructure, such as, for example, a public or private "cloud."

The network 120 is operated by a host and may include portions that are privately accessible and portions that publically assessable from devices located within the network 120 as well as devices located outside of the network 120 (e.g., remote access). In various aspects, the user machines 110 and host machines may be accessed locally and/or remotely, which may include access via the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The environments 130 represent distinct subsections of the network 120, which each include one or more host machines (physical or virtual). Each environment is associated with one or more certificates 140 that are obtained from a certificate authority to enable the initialization of a secure and encrypted communications session with user machines 110 located remotely to the network 120. One of ordinary skill in the art will appreciate the operation of certificate-based secure communications.

Each certificate 140 identifies the party to whom it was issued by the certificate authority (e.g., the host), includes a public key of a public/private key pair that is transmitted to the user machines 110, and includes expiration data for how long the certificate 140 will remain valid (i.e., a length of time or date at which the certificate authority will automatically revoke the certificate). In various aspects, the certificate 140 also includes data related to: version information, a serial number or other identifier for the certificate 140, the identity of the issuing certificate authority, a digital signature from the certificate authority, the algorithm used to create the signature, an issuance date from which the certificate is valid, a use case for the public key, a hash of the public key, and various other extensions. As will be appreciated, the private key of the public/private key pair is stored by the environment 130 on which the certificate 140 is stored, to decrypt messages sent encrypted with the public key. Within a network 120, the management of certificates 140 on various environments 130 should conform to various best practices to ensure the security of the network 120; however, many network administrators lack the tools to manage a large number of certificates deployed on a large number of environments 130 and individual machines, which can lead to several poor security practices.

In a first example of violating best security practices for the use of certificates 140 (i.e., practicing poor certificate security), two environments 130 may include the same certificate 140, such as is illustrated with the first environment 130a including a first certificate 140a that is identical to the third certificate 140c deployed on the third environment 130c, which exposes both environments 130 to attacks that are successfully made on the other environment 130. A malicious party who gains access to a private key for a certificate 140 may seek to deploy the compromised certificate 140 to several environments 130 to intercept communications to that environment 130 or to provide backdoor access to that environment 130. The best practice, therefore, is to ensure that a given certificate 140 is not deployed to more than one environment 130.

In a second example, an expired or otherwise invalid certificate 140, such as the second certificate 140b deployed on the second environment 130b, remains deployed on the environment 130. Because the public key included in the certificate 140 is vulnerable to being solved, deciphered or otherwise used over a period of time (e.g., via a brute force attack to allow a malicious party to intercept communications and masquerade as the host), the expiration date provides a time-bound (e.g., 90 days) for how long the certificate 140 is expected to be secure. The user machine 110 is operable to check the expiration date against its system clock to independently verify whether the certificate 140 is still valid. The user machine 110 is also operable to check whether a certificate 140 is still valid by checking an identifier for the certificate against a Certificate Revocation List (CRL) hosted by the network 120 or the certificate authority. Maintaining a certificate 140 on an environment 130 after that certificate 140 has expired or has been invalidated (revoked) allows the environment 130 to continue interpreting communications encrypted by the corresponding public key, which may expose the environment 130 to commands and requests issued by malicious parties. The best practice, therefore, is to remove expired, revoked, or otherwise invalid certificates 140 from the environments 130 in which they are deployed.

In a third example, an unused certificate 140 is deployed to an environment 130, such as the fifth certificate 140e deployed to the fourth environment 130d (which uses the fourth certificate 140d). A certificate 140 that is not used, or is infrequently used, poses several problems to the host, including, but not limited to: increased maintenance costs (e.g., renewing the certificate), confusing the users who may alternate public keys, exposing public keys to earlier deciphering/utilization attempts, etc., and may be indicative of a maliciously installed certificate 140 that allows a malicious party to gain access to the environment 130 or intercept communications to that environment 130. The best practice, therefore, is to only deploy certificates 140 to environments 130 when those certificates 140 are needed or expected to be used.

As will be appreciated, other violations of best practices for the use of certificates 140 exist, and the above examples are given as non-limiting illustrations of poor security practices. As will also be appreciated, various exceptions exist to the above examples that would make an otherwise poor security practice acceptable or advisable.

Figure 2:
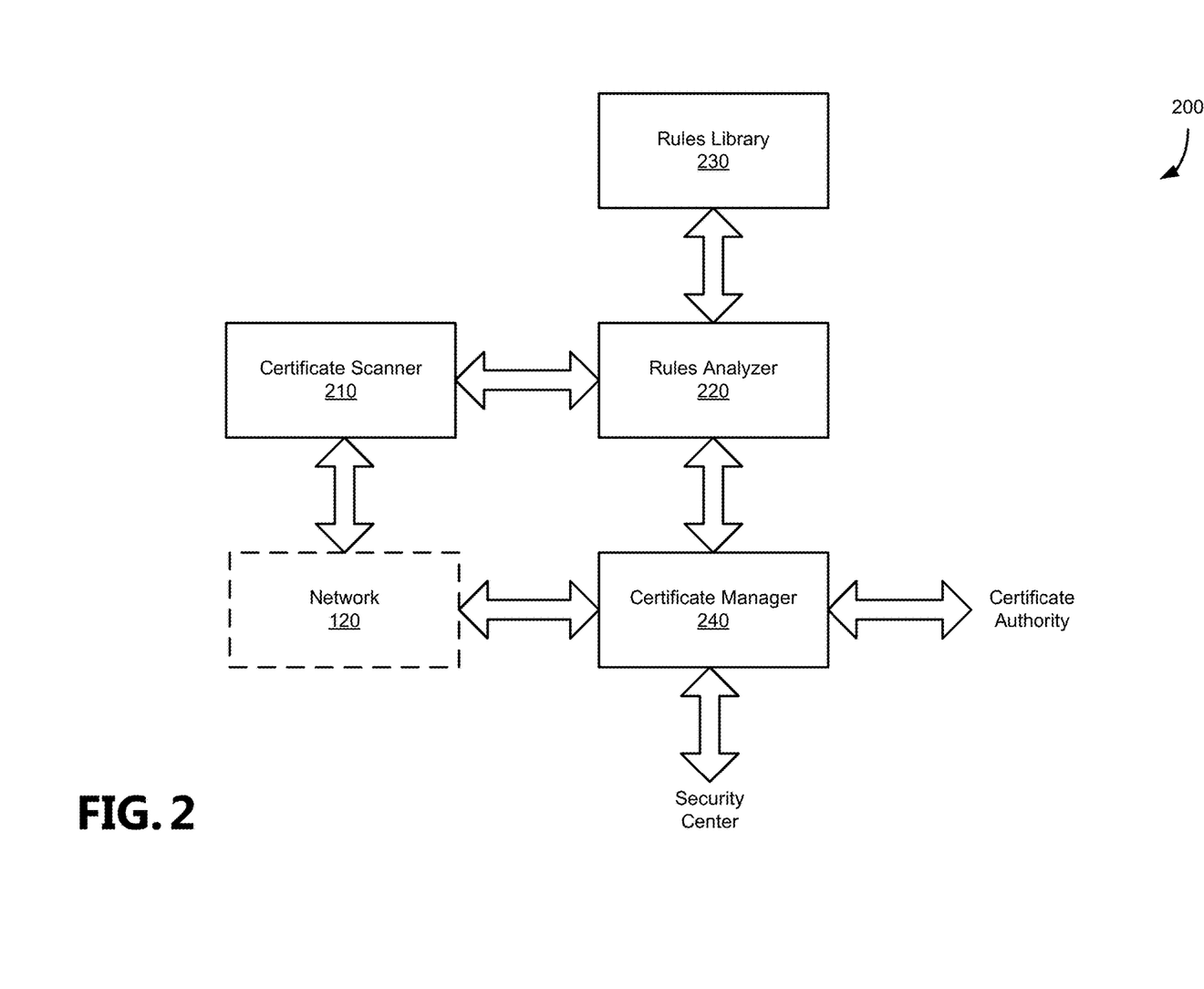
FIG. 2 illustrates an example certificate monitoring system.

FIG. 2 illustrates an example certificate monitoring system 200 that is operable to monitor the use of certificates 140 to detect poor security practices (i.e., violations of best practices) and malicious use of certificates 140. In various aspects, the certificate monitoring system 200 may be run on one or more computing devices part of one or more environments 130 or may be run on one or more computing devices that are in communication with, but not part of, the host's network 120.

As illustrated, a certificate scanner 210 is in communication with the network 120 to collect data that map the environments 130 and the certificates 140 deployed thereon to provide to a rules analyzer 220. The rules analyzer 220 is operable to receive a set of rules related to certificate misuse from a rules library 230 to provide a determination on the use of certificates 140 in the network 120 to a certificate manager 240. The certificate manager 240 is in communication with a certificate authority, a security center, and the network 120 to notify network managers to the status of certificate usage in the network 120, and to request, revoke, and deploy certificates 140.

The certificate scanner 210 is operable to scan the host machines in a network 120 to identify the certificates 140 deployed thereto to create a map of how certificates 140 are used in various environments 130 of the network 120. Various properties of the machines and environments 130 in addition to the presence (or absence) of certificates 140 thereon are also collected by the certificate scanner 210 or passed to the certificate scanner 210 by another scanner in various aspects. For example, properties may be related to, but are not limited to: the security procedures for the environment 130; whether the environment 130 is designated for production, testing, security (e.g., a honeypot), etc.; operating system or other software information (e.g., versions, update policies); and network access information (e.g., frequency of access, number of unique requests, average session length).

In one example, the certificate scanner 210 scans the network 120 and identifies two environments 130; a test environment 130 and a production environment 130. The certificate scanner 210 produces a map that identifies the machines part of each of the example environments 130 and the certificates 140 that are deployed on each of those environments 130, additional information related to each of those environments 130 and certificates 140 (e.g., security procedures or network access information for each environment 130, expiration dates for each certificate 140). This map is then transmitted to the rules analyzer 220 to detect the misuse of certificates 140.

The rules analyzer 220 is operable to receive the map from the certificate scanner 210 and rules from the rules library 230 to determine whether the certificates 140 deployed in the network 120 violate best practice rules or satisfy malicious use detection rules. The rules analyzer 220 is in communication with the certificate manager 240 to transmit the results of its determinations regarding the map and the rules. In additional aspects, the rules analyzer 220 also receives feedback from the certificate manager 240 related to how the network administrators reacted to its determination, which are communicated to update the rules stored in the rules library 230. As will be appreciated, the rules held in the rules library 230 may be updated by one of several machine learning algorithms or may be hard rules that may be updated manually, but are unaffected by reactions received from the certificate manager 240. In various aspects, the rules library 230 is specific to a given host or network 120 whereas in other aspects a rules library 230 is shared between multiple hosts or networks 120, such as, for example, by a security provider or cloud service provider on which the network 120 is run/hosted.

Examples of rules provided in the rules library 230 include best practices and malicious use detection rules. One example of a best practice is whether a certificate 140 is being used across different environments 130 or subscriptions, such as when a developer uses the same certificate 140 in a production environment 130 as in a test environment 130. A first example of a malicious use detection rule, using abnormal certificate usage to detect a potential attack, is when a large number of machines are examined, but a given certificate 140 is only deployed to a subset of those machines, which indicates that an attacker may be attempting to gain access to a small number (e.g., the subset) of the machines by installing intrusive certificates 140. A second example of malicious use detection is detecting a certificate 140 that is signed from a certificate authority that is different than the certificate authorities who signed the other certificates 140, is self-signed, or is signed by a suspicious chain of certificate authorities. A third example of a malicious use detection rule is to detect changes to certificate deployment made over time, such as, for example, when certificates 140 are regularly updated every six months, an update made at an earlier time or a delayed update is indicative that a change, which indicates a change in routine that may be the result of a malicious party installing intrusive certificates 140. As will be appreciated, the above examples are non-limiting; in various aspects, the rules library 230 contains more or different sets of rules.

The certificate manager 240 is in communication with a network administrator through a user interface (either specific to the certificate manager 240 or part of a network security center) to manage the deployment of certificates 140 on the network 120 and to learn about how they are deployed according to the rules analyzer 220. The certificate manager 240 is operable to communicate the network administrator's decisions regarding certificate deployment back to the rules analyzer 220 to affect and update the rules (e.g., through a machine learning algorithm) and to implement those decisions on the network 120. The certificate manager 240 is further operable, in some aspects, to use crowd knowledge to incorporate decisions from multiple network administrators who manage multiple different networks with the decisions of the network administrator of the given network 120 or any other input which can be derived from other users. Crowd knowledge allows signals, inputs, and data collected from different administrators or groups of administrators, who are not necessarily aware of each other, to be leveraged. For example, if an attack with distinct features were noticed to be spreading in a geographic area (or spreading in subscriptions, tenants, or any other logical group), the data which were collected and aggregated (e.g., "crowd knowledge") from the affected networks 120 may be used to derive insights on other networks 120 sharing the attack's description. Similarly, the signals/data of the crowd knowledge may be drawn from a subset of users' rules that are not affected (or minimally affected) by a given attack to determine additional best practices or rules. As will be appreciated, a machine learning algorithm is operable to apply different weights to the decisions made by the administrator of a given network 120 and the crowd knowledge based on the decisions made by the administrators of multiple networks. In various aspects, the certificate manager 240 is authorized by the network administrator to automatically perform various actions to affect the deployment of certificates 140 on the network 120, while in other aspects, the certificate manager 240 performs the commands in response to a signal from the network administrator.

To affect the deployment of certificates 140 on the network 120, the certificate manager 240 is operable to request new certificates 140 from a certificate authority, revoke certificates and notify the certificate authorities to the revocation, install new certificates 140 on various machines in the network 120, and uninstall certificates 140 from various machines in the network 120 (including deleting, isolating/quarantining, backing out, or disabling certificates 140). The certificate manager 240 is operable to perform these deployment actions on multiple machines across multiple environments 130 in response to a single command (e.g., an entire environment 130 or network 120) or on specific machines as part of a "one-click" remediation response from the network administrator.

Figure 3:
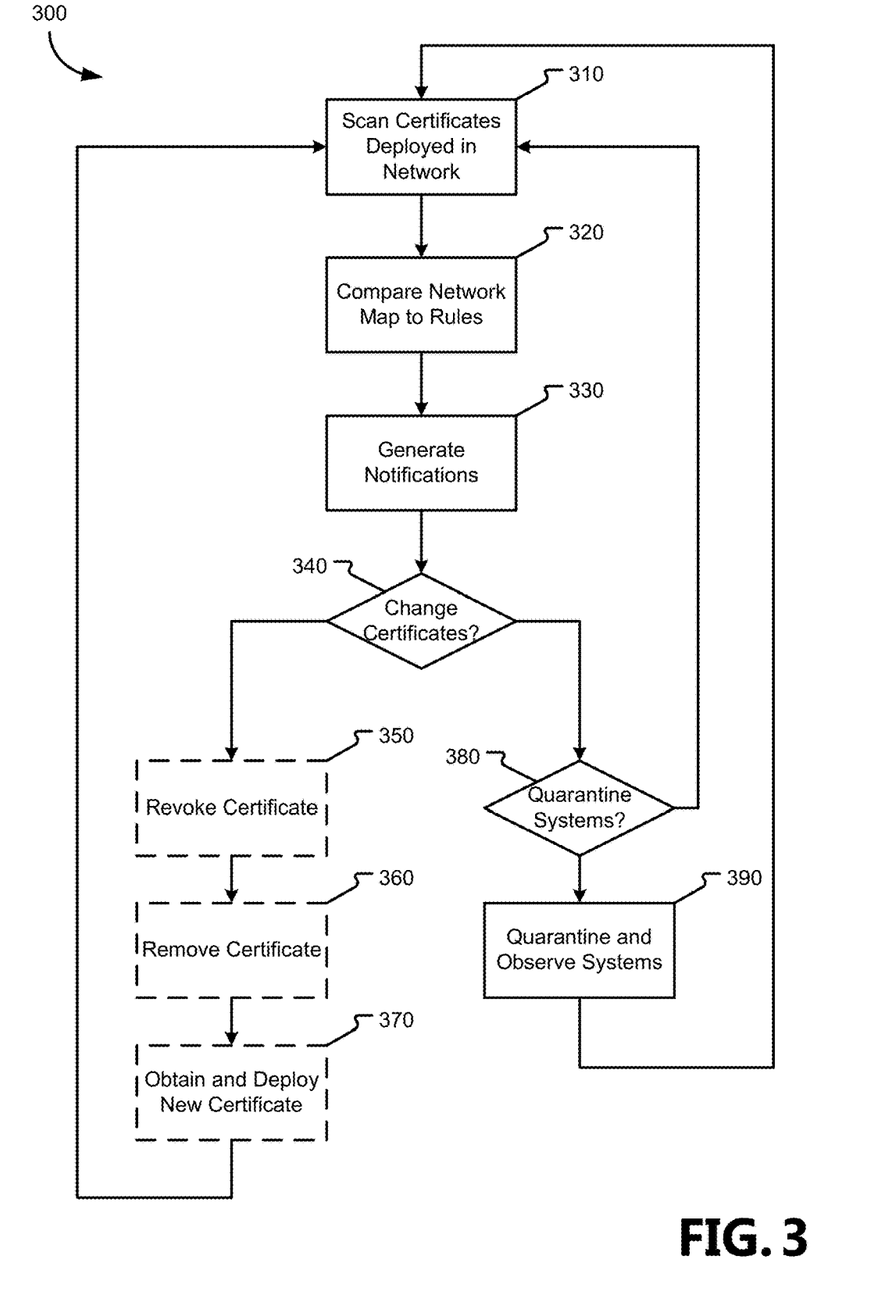
FIG. 3 is a flow chart showing general stages involved in an example method for improving the security of a network.

FIG. 3 is a flow chart showing general stages involved in an example method 300 for improving the security of a network 120 by monitoring certificate misuse. Method 300 begins at OPERATION 310, where the certificates 140 deployed in a network 120 are scanned to produce a network map of the deployment. In various aspects, the network 120 is scanned on a periodic basis (e.g., every hour, day, week), in response to a change in the deployment of certificates 140, in response to a change in a number of host machines part of the network 120, or a user request for a scan.

The network map is compared to various rules at OPERATION 320. In various aspects, the set of rules include rules to detect duplicate certificates deployed to multiple environments 130, expired/revoked/invalid certificates 140 in the network 120, unused/rarely used certificates 140, recent deployments, changes in deployments, unrequested deployments and other rules to detect the misuse of certificates 140 in the network 120. Changes to the network map are also tracked and compared to rules at OPERATION 320, for example, to detect the unauthorized deployment of certificates 140 to one or more machines, or to track the spread of various certificates 140 throughout the network 120 based on changes to the network map over time.

Various rules report when they are violated (e.g., a best practice rule), satisfied (e.g., a malicious use detection rule), or produce metrics (e.g., a number of unique certificates 140) that are included in notifications generated at OPERATION 330. In some aspects, the notifications are transmitted to a security center to notify a network administrator to the state of certificate deployment on the network 120, and in additional aspects, the notifications may be consumed internally by a certificate monitoring system 200 to automatically address the reason behind the notification in addition to or instead of transmitting the notifications to the security center. For example, a network administrator may receive a notification indicating that two or more environments 130 have an identical certificate 140 deployed thereon, and the administrator may be prompted to select one or more (including all) environments 130 from which the certificate 140 is to be removed. In another example, a certificate monitoring system 200 may generate a notification that indicates that an environment 130 includes an expired certificate 140, and automatically removes the expired certificate 140 from the environment 130.

At DECISION 340 it is determined whether the network administrator has signaled to change the deployment of certificates 140 in response to one or more notifications (or the certificate monitoring system 200 has permission to do so automatically). When it is determined that a change in the deployment of certificates 140 is to take place, method 300 proceeds to one or more of optional OPERATIONS 350-370 to adjust the deployment of certificates 140 across the network 120. When it is determined that a change in the deployment of certificates 140 is not to take place, method 300 proceeds to DECISION 380.

Depending on the change signaled by the network administrators or the certificate monitoring system 200, changing the deployment of certificates 140 in the network 120 may involve one or more of: receiving a new certificate 140, installing a certificate 140, uninstalling a certificate 140, and revoking a certificate 140. After changing the deployment of certificates 140 in the network 120, method 300 returns to OPERATION 310 to continue monitoring the network 120.

At optional OPERATION 350, an identified certificate 140 is revoked. In various aspects, the certificate 140 is revoked by informing one or more certificate authorities that the certificate 140 is no longer valid, or posting an identifier for the certificate 140 in question to a Certificate Revocation List to prevent clients from using or trusting communications that use the identified certificate 140.

At optional OPERATION 360, a certificate 140 is removed from an environment 130. In various aspects, removing the certificate 140 from an environment 130 uninstalls that certificate 140 from the machines comprising the environment 130. In another aspect, removing the certificate 140 from an environment 130 removes the certificate 140 from a list of approved certificates 140 (or adds it to a list of forbidden certificates 140) so that the machines may retain the certificate 140 in the event they are moved to another environment 130, but can no longer use the certificate 140 while part of the environment 130 from which the certificate 140 is removed.

At optional OPERATION 370 a new certificate 140 is obtained and deployed within the network 120. In various aspects, the new certificate 140 is obtained from a certificate authority, which verifies the identity of the host and provides a newly created certificate 140. In additional aspects, the new certificate 140 is a certificate 140 that has already been issued to the host from a certificate authority, but has not been deployed to one or more specific machines in the network 120. When the certificate 140 is deployed within the network 120, it and the corresponding private key are installed on the machines included in the environment 130 in which it is to be deployed, and those machines are then operable to sign, verify, encrypt, and decrypt messages according the public/private key pair.

At DECISION 380 it is determined whether the network administrator has signaled to quarantine one or more host machines in response to one or more notifications (or the certificate monitoring system 200 has permission to do so automatically). In various aspects, a malicious party may be detected via the misuse of certificates 140 observed via the network rules, but the network administrators wish to observe the actions of the malicious party to improve the detection rules, but do not want the malicious party to harm the host's legitimate clients or expose the host's data. When it is determined at DECISION 380 that one or more host machines are to be quarantined, method 300 proceeds to OPERATION 390, otherwise method 300 proceeds to OPERATION 310.

At OPERATION 390, one or more identified systems are quarantined so that the host is able to observe the systems, and any interactions made by malicious parties with those systems, but preventing those interactions from negatively affecting the host or clients connected to the host (e.g., via a man-in-the-middle attack). In one example, an environment 130 that is quarantined has its access rights to other environments 130 in the network 120 terminated or substituted for a honeypot environment 130, has sensitive files or data on its machines removed or replaced with false versions, and any changes or data received to the environment 130 or its machines are deleted, moved to an inactive directory, or ignored (not finalized on the given machine). One of ordinary skill in the art will be familiar with various actions taken to quarantine systems. Method 300 then returns to OPERATION 310 to continue monitoring the deployment of certificates 140 in the network 120.

Figure 4:
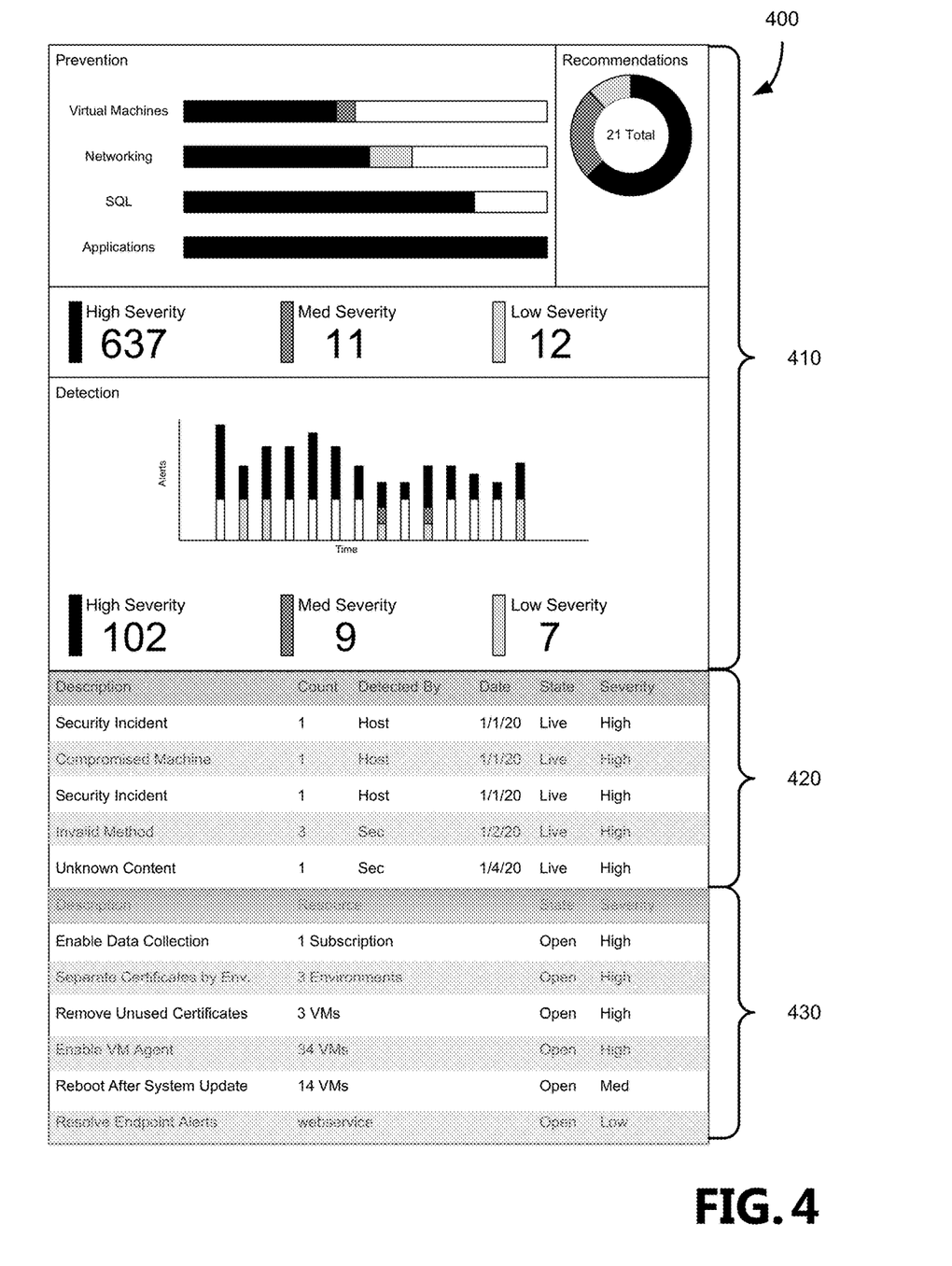
FIG. 4 is an example dashboard.

FIG. 4 is an example dashboard 400 by which a network administrator is enabled to affect the deployment of certificates 140 on various environments 130 in a network 120 from a centralized application. In various aspects, the example dashboard 400 may be provided as part of a security center application in communication with the certificate manager 240 to allow the network administrator to affect the deployment of certificates 140 on various environments 130 of the network. As will be appreciated, the controls and datagrams presented in the example dashboard 400 of FIG. 4 may be modified or adjusted to include more or less data in different arrangements than what is illustrated to meet the needs of the network administrators in various different aspects, and therefore does not limit the functionality of the example dashboard 400 to the illustration.

In various aspects, the example dashboard 400 is presented as a user interface for a certificate manager 240, which may be a standalone interface or a plugin to an existing user interface for a security center for the network 120 that the certificate monitoring system 200 monitors for the misuse of certificates 140. The data provided in the example dashboard 400 includes data received from the rules analyzer 220, which is presented in time series, category aggregations, severity aggregations, individual events, and in association with various remediation recommendations in various aspects.

As illustrated in the example dashboard 400, a metrics section 410 provides the users with an overview and various datagrams related to the deployment of certificates 140 in the network 120. In the illustrated example, a metrics section 410 displays a number and a severity of various rules violations and detected (potentially) malicious actions related to the security of the network 120. These detected suspicious actions and detected violations of best practices within the network 120 are displayed in variously formatted lists, datagrams, and time series, which may be associated with various controls to modify their presentation, to display related metrics, or to enact suggestions to mitigate the violations or effect of the suspicious actions. The metrics section 410 is customizable by the user to show more or fewer metrics and in different arrangements than shown in FIG. 4.

An alerts section 420 and a recommendations section 430 are illustrated in the example dashboard 400 to provide the user with a list view of the detected suspicious actions and detected violations of best practices within the network 120 respectively. The lists views presented in the alerts section 420 and the recommendations section 430 are operable to be sorted by the user according to: name, number, recentness, the party or service that detected the issue, whether the detected issue is live/open or quit/resolved, severity, resources affected, etc. In various aspects, an item in an alerts section 420 or a recommendations section 430 is selectable to enable the user to obtain more information about that item, or to signal the certificate manager 240 (or other responsible agent) to address the selected item by one or more presented recommendations.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
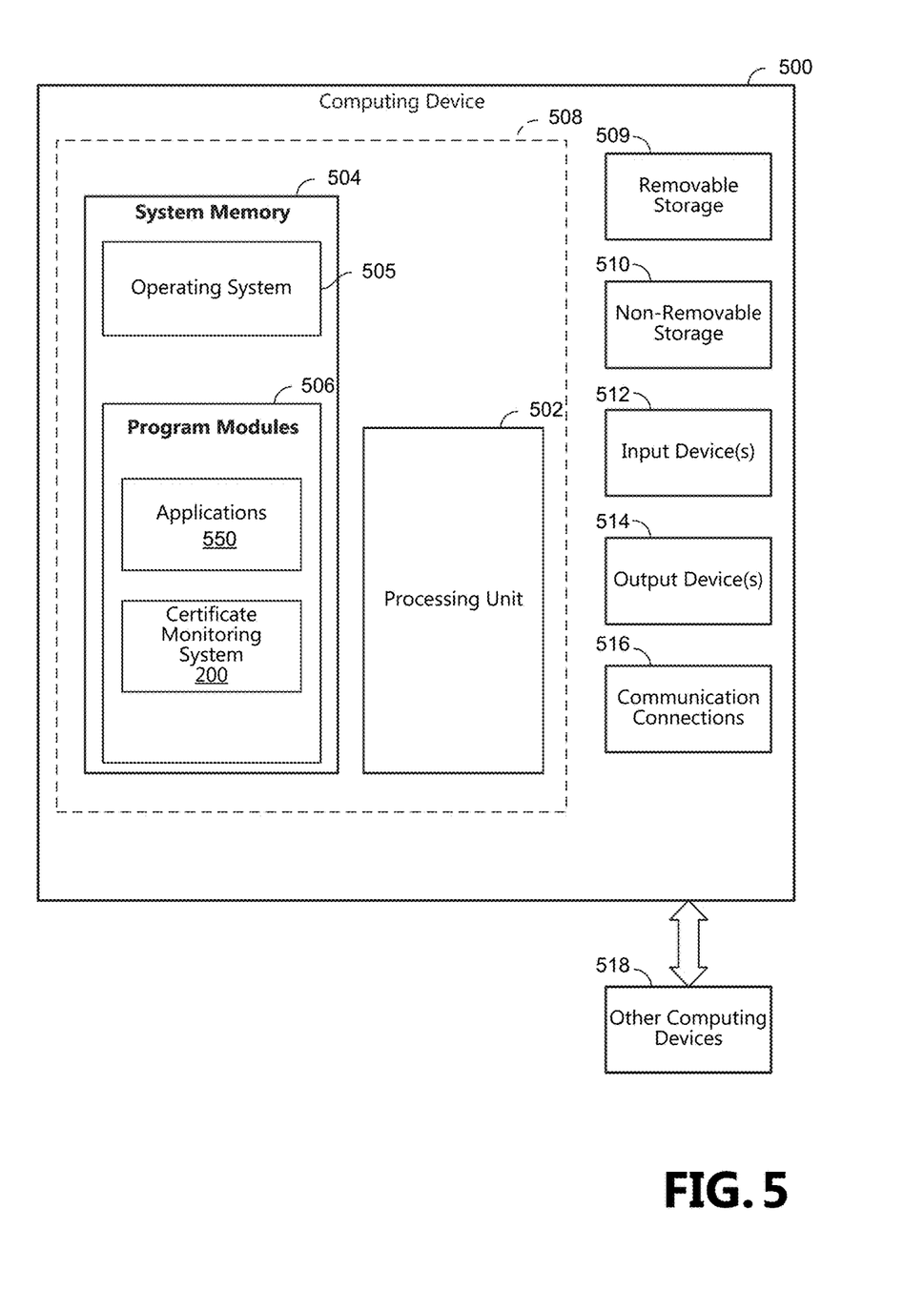
FIG. 5 is a block diagram illustrating example physical components of a computing device.
Figure 6A:
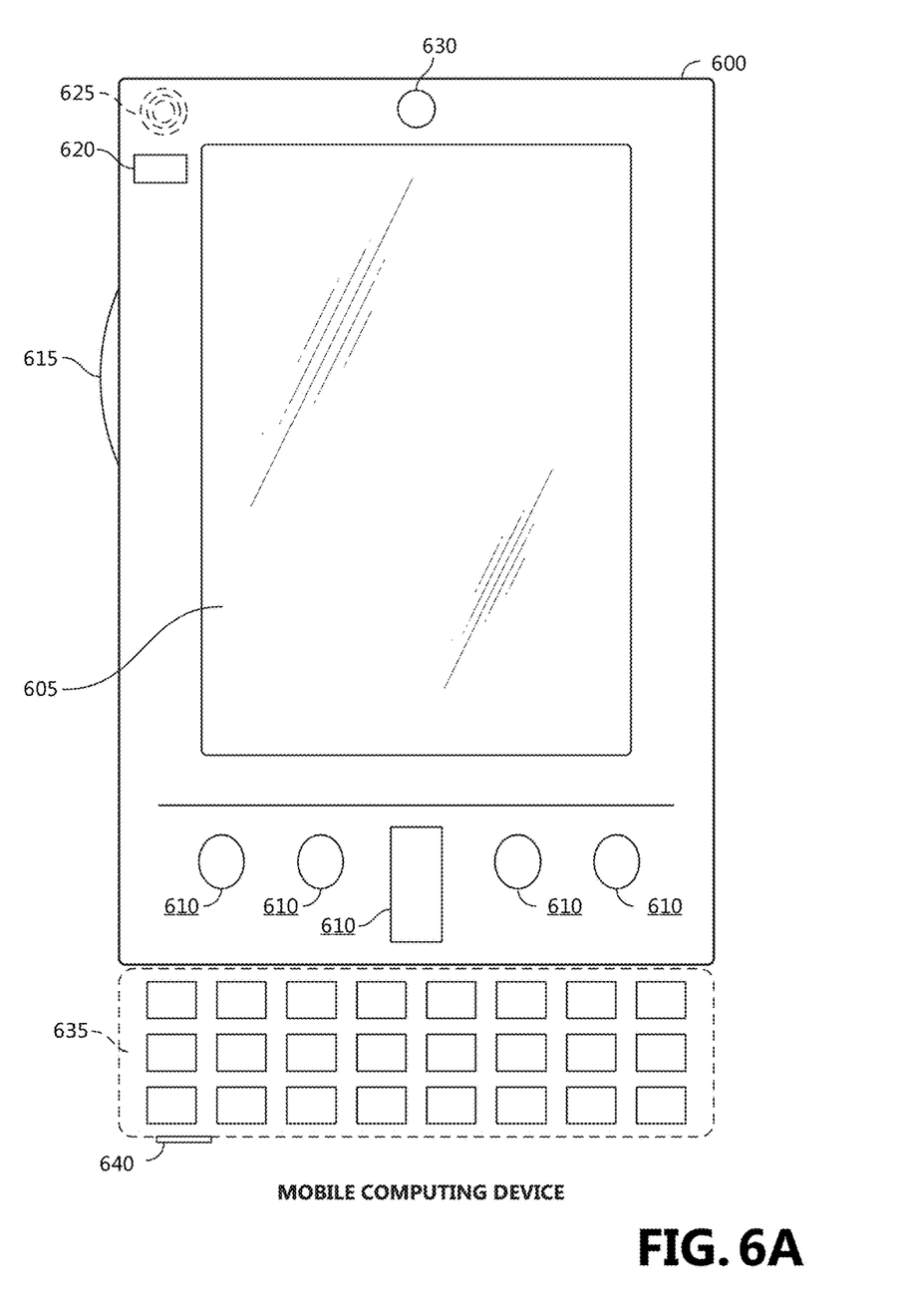
FIGS. 6A and 6B are block diagrams of a mobile computing device.
Figure 6B:
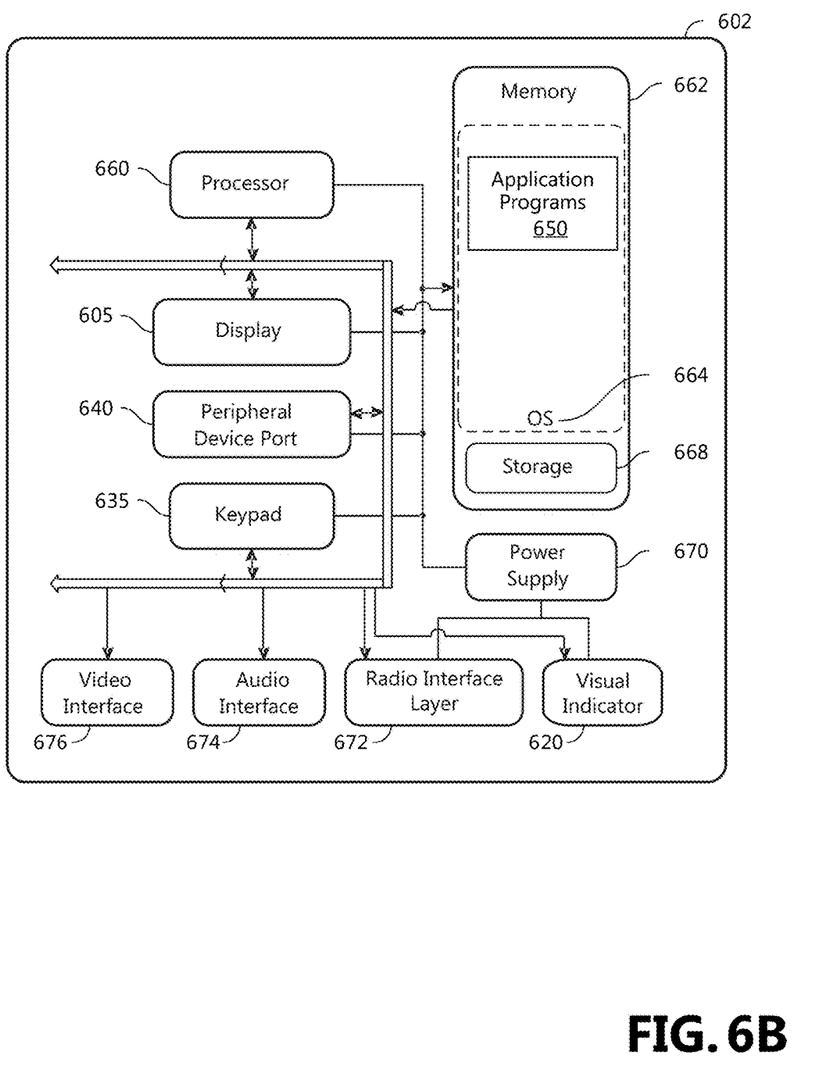
Figure 7:
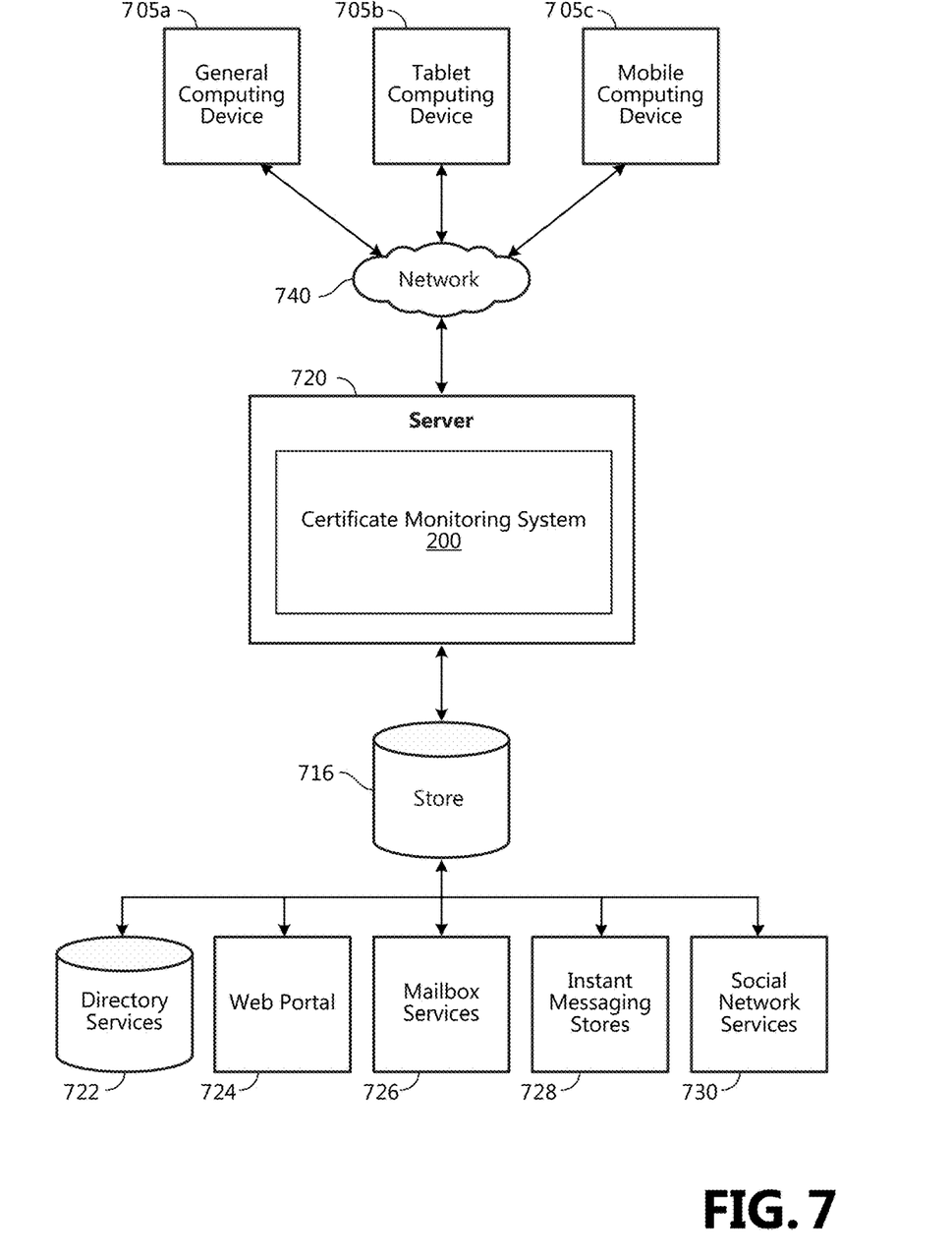
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes a certificate monitoring system 200. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., certificate monitoring system 200) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or fewer input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, an application to access the dashboard 400 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 are stored locally on the mobile computing device 600, as described above. According to another aspect, the data are stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information are accessible via the mobile computing device 600 via the radio 672 or via a distributed computing network. Similarly, according to an aspect, such data/information are readily transferred between computing devices for storage and use according to well-known data/information transfer and storage means, including electronic mail and collaborative data/information sharing systems.

FIG. 7 illustrates one example of the architecture of a system for improving the security of networked systems and environments as described above. Content developed, interacted with, or edited in association with the certificate monitoring system 200 is enabled to be stored in different communication channels or other storage types. For example, various documents may be stored using a directory service 722, a web portal 724, a mailbox service 726, an instant messaging store 728, or a social networking site 730. The certificate monitoring system 200 is operative to use any of these types of systems or the like for improving the security of networked systems and environments, as described herein. According to an aspect, a server 720 provides the certificate monitoring system 200 to clients 705a,b,c. As one example, the server 720 is a web server providing the certificate monitoring system 200 over the web. The server 720 provides the certificate monitoring system 200 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for improving network security, comprising:
   scanning a network to detect certificates deployed within the network;
   generating a network map based on the certificates detected as deployed within the network;
   comparing the network map to a set of rules;
   generating notifications based on the network map relative to the set of rules;
   determining whether to change a deployment of certificates in response to the notifications; and
   in response to determining to change the deployment of certificates, adjusting the certificates deployed to one or more environments of the network.

2. The method of claim 1, wherein the set of rules are operable to detect:
   an invalid certificate;
   an identical certificate deployed to more than one environment in the network; and
   an unused certificate.

3. The method of claim 2, wherein in response to detecting the invalid certificate, uninstalling the invalid certificate from the network.

4. The method of claim 2, wherein in response to detecting the identical certificate, adjusting the certificates deployed to the one or more environments of the network comprises:
   uninstalling the identical certificate from at least one of the more than one environments.

5. The method of claim 2, wherein in response to detecting the invalid certificate, adjusting the certificates deployed to the one or more environments of the network comprises:
   revoking the invalid certificate via a certificate revocation list; and
   uninstalling the invalid certificate from the network.

6. The method of claim 1, wherein adjusting the certificates deployed to the one or more environments of the network comprises:
   requesting a new certificate from a certificate authority and deploying the new certificate to at least one environment of the network.

7. The method of claim 1, wherein generating notifications based on the network map relative to the set of rules includes:
   providing metrics related to the deployment of certificates in the network;
   determining whether a best practice for certificate deployment is violated; and
   determining whether a malicious use detection rule is satisfied.

8. The method of claim 1, wherein comparing the network map to the set of rules includes comparing changes to the network map over time to detect one or more host machines affected by a malicious deployment of certificates.

9. The method of claim 8, in response to detecting the malicious deployment of certificates, quarantining the one or more host machines.

10. A system for improving network security, comprising:
   a processor; and
   a computer-readable memory device, including instructions that when executed by the processor provide:
      a certificate scanner, operable to scan host machines in a network to identify certificates deployed on the host machines to produce a network map;
      a rules analyzer, operable to receive the network map from the certificate scanner to determine whether the certificates deployed in the network violate best practice rules or satisfy malicious use detection rules; and
      a certificate manager, operable to manage the deployment of certificates on the network in response to the best practice rules being violated or the malicious use detection rules being satisfied.

11. The system of claim 10, wherein the certificate manager is further operable to:
   transmit notifications to a user indicating the best practice rules being violated or the malicious use detection rules being satisfied;
   receive commands from the user in response to the notifications;
   wherein the certificate manager manages the deployment of certificates on the network in response to the commands received from the user.

12. The system of claim 11, wherein the malicious use detection rules are updated via a machine learning algorithm based on the commands received from the user and crowd knowledge.

13. The system of claim 11, wherein the commands authorize the certificate manager to automatically manage the deployment of certificates on the network in response to the best practice rules being violated or the malicious use detection rules being satisfied.

14. The system of claim 11, wherein the commands authorize the certificate manager to quarantine the host machines in response to the malicious use detection rules being satisfied.

15. The system of claim 10, wherein the certificate manager is further operable to:
   request a new certificate to replace an existing certificate deployed to a given host machine, wherein the existing certificate being deployed to the given host machine violates the best practice rules or satisfies the malicious use detection rules; and
   deploy the new certificate to the given host machine.

16. The system of claim 15, wherein the new certificate is stored on the network, but has yet to be deployed.

17. A computer readable storage device including instructions for improving network security, comprising:
   scanning a network to detect certificates deployed within the network;
   generating a network map based on the certificates detected as deployed within the network;
   comparing the network map to rules;
   generating notifications based on the network map relative to the rules;
   determining whether to change a deployment of certificates in response to the notifications; and
   in response to determining to change the deployment of certificates, adjusting the certificates deployed to one or more environments of the network.

18. The computer readable storage device of claim 17, wherein adjusting the certificates deployed to the one or more environments of the network comprises:
   requesting a new certificate from a certificate authority and deploying the new certificate to a given environment of the network.

19. The computer readable storage device of claim 18, wherein if an existing certificate deployed to the given environment is determined by the rules to be expired, revoked, or identical to a certificate deployed on a different environment, replacing the existing certificate by the new certificate.

20. The computer readable storage device of claim 17, further comprising updating the rules according to a machine learning algorithm based on determinations of whether to change the deployment of certificates received from a user.

* * * * *